Jan. 28, 1969 R. J. RAVAS 3,424,948
OVERVOLTAGE PROTECTION CIRCUIT FOR CONTROLLED SOLID STATE VALVES
Filed Dec. 12, 1966
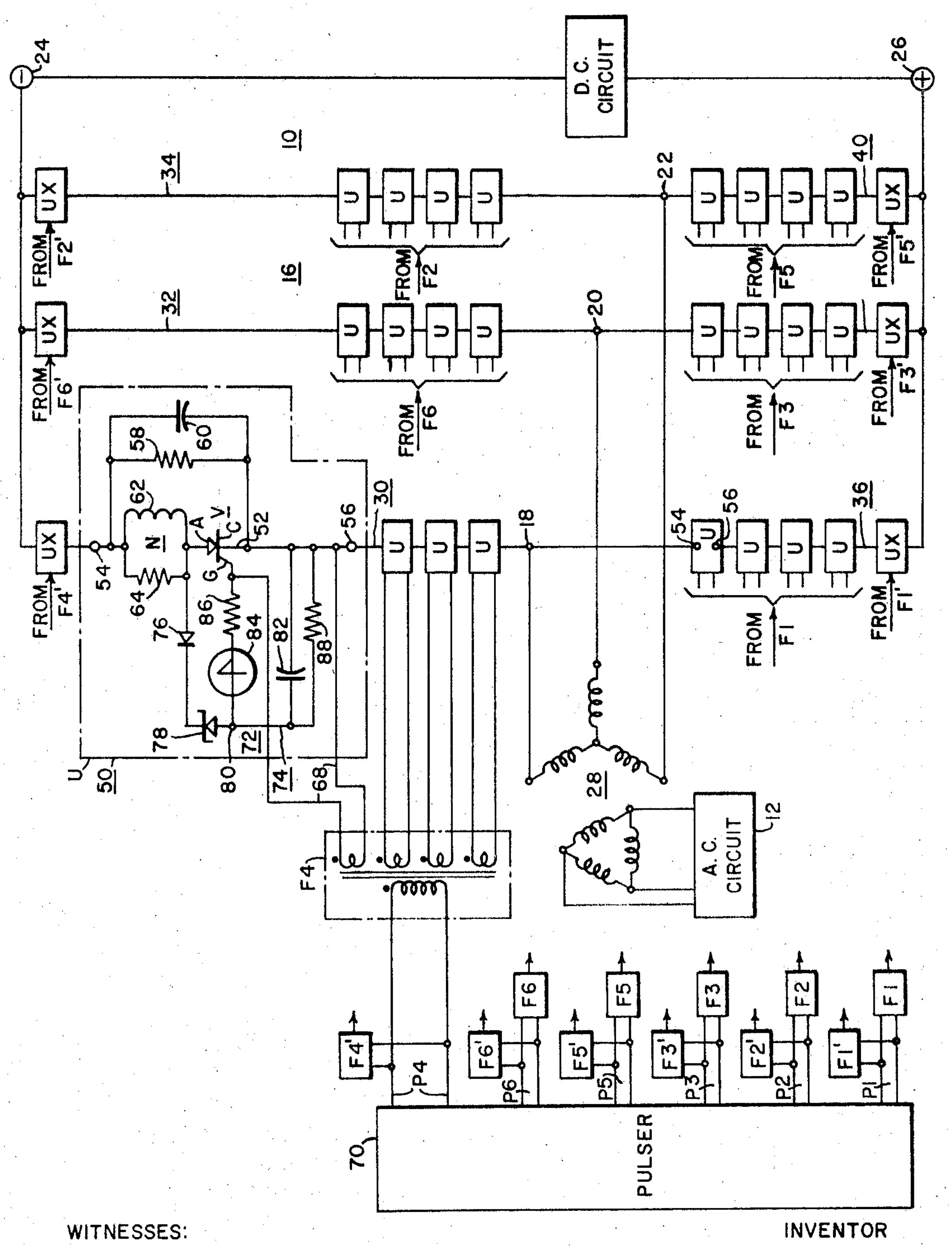
WITNESSES:
Leon M. Garman
Wm. B. Sellers.
INVENTOR
Richard J. Ravas
BY
Clement J Paznokas
ATTORNEY

United States Patent Office 3,424,948

Patented Jan. 28, 1969

3,424,948

OVERVOLTAGE PROTECTION CIRCUIT FOR CONTROLLED SOLID STATE VALVES

Richard J. Ravas, Monroeville, Pa., assignor to Westinghouse Electric Corporation, Pittsburgh, Pa., a corporation of Pennsylvania Filed Dec. 12, 1966, Ser. No. 600,866

U.S. Cl. 317—31 13 Claims

Int. Cl. H02h *3/28*

ABSTRACT OF THE DISCLOSURE

The disclosure describes a high voltage electric converter wherein, in addition to a voltage sharing arrangement for a series string of controlled solid state valves, each valve has connected thereacross a circuit including in series a voltage threshold device and a capacitor with a junction therebetween. A voltage breakover device is connected between the junction and the control electrode of the valve. The arrangement is such that when the voltage across the valve exceeds a predetermined value the threshold device is overcome and the capacitor charges until it reaches the breakover voltage of the breakdown device thereby to break down the breakdown device and fire the valve. The control signal is maintained on the control electrode until the capacitor is discharged.

This invention relates to electric power converters, for example rectifiers and inverters, employing controlled solid state valves, and more particularly to the protection of such valves against overvoltage transients.

The invention is especially useful in high voltage systems wherein a series string of controlled solid state valves operating in the switching mode, for example controlled semiconductor rectifiers (thyristors) may have thereacross operating voltages of the order of 500,000 volts and higher. If "500 volt" rated thyristors are used, it is apparent that about 1000 thyristors would be required in a series string subject to normal operating potentials of 500,000 volts. Techniques have been developed to insure equal voltage distribution or sharing between a plurality of series connected thyristors. Techniques have also been developed to limit the power current rate-of-rise through each device. However, even with these techniques, there is no real protection in the case of an overvoltage transient across the entire string.

The early "low voltage" thyristors were not seriously affected or damaged by overvoltage transients. They merely assumed their high conduction state whenever their forward breakover voltage was exceeded and did not hang up in a high dissipation state. However, with the newer "high voltage" thyristors, it was found that repetitive transients of this type caused gradual deterioration of the forward blocking capability due to the instantaneous peaks of power dissipated in localized junction imperfections during turn-on. The only way to overcome this effect is to gate the thyristor on very strongly at all times, thus bringing the entire device into conduction at once and eliminating local "hot spots." To achieve such turn-on, it has been heretofore suggested to either build into the thyristors a uniform forward avalanche effect, or to add an external avalanche diode from anode to gate. Neither scheme offered a great improvement, since a controlled avalanche junction built into the thyristor cannot be practically built with sufficient uniformity to insure that breakdown will not initiate at a point as in a conventional thyristor. The external avalanche diode offered no real improvement either since, normally, as it started to conduct the thyristor anode voltage dropped, removing the gate drive, and it resumed the undesirable anode breakover mode (two terminal mode).

It is therefore an object of the present invention to provide a protection circuit that will sense overvoltage across a controlled solid state valve and apply an intense drive pulse to the control electrode of the valve and maintain the pulse until substantial conduction takes place thereby to prevent two terminal operation and destruction.

Another object of the invention is to provide such a protection circuit that is especially compatible for use across each of a plurality of series connected controlled solid state valves, especially where that plurality is of an extremely high order.

Another object is to provide such a protection circuit that is economical and simple in configuration.

Other and further objects and advantages will become apparent from the following detailed description taken in connection with the single figure drawing wherein a diagram illustrates a preferred embodiment of the invention in connection with a high voltage electric converter.

As seen in the drawing, an electric converter 10 is interposed between an AC (alternating current) circuit 12 and a DC (direct current) circuit 14. By way of example, converter 10 is shown as a three phase bridge 16 having AC terminals 18, 20 and 22, and DC terminals 24 and 26. Terminals 18, 20 and 22 are coupled to the AC circuit 12 through a three phase power transformer 28. While the transformer 28 is shown as having delta-Y windings, any other suitable configuration may be employed for example delta-delta, Y-Y, or other. Terminals 24 and 26 are connected to the DC circuit 14. The AC circuit 12 may be a source of alternating current, and the DC circuit 14 a load circuit, in which case converter 10 will operate as a rectifier. On the other hand DC circuit 14 may be a DC source of power, while the AC circuit 12 is a load circuit, in which case converter 10 is operating as an inverter. Thus the system in the drawing is representative of either AC or DC conversion or DC to AC conversion.

The bridge 16 is povided with six legs 30, 32, 34, 36, 38 and 40. Leg 30 is connected between terminals 24 and 18; leg 32 between terminals 24 and 20; leg 34 between terminals 24 and 22; leg 36 between terminals 18 and 26; leg 38 between terminals 20 and 26; and leg 40 between terminals 22 and 26.

Each leg of bridge 16 is provided with a plurality of controlled units U connected in series. In each leg, four of the units U are shown as boxes labeled U. Additionally, in series in each leg there is a section labeled UX which represents a high order plurality of units U in series. This is to emphasize that the invention is particularly useful in connection with very high voltage systems. For example, the total number of units U in series with each leg may be as high as 500, or higher, the number being dependent on the operating voltages to which each leg is subjected to. By way of example each section UX will be considered as having 496 units U, thus with the four units labelled U in each leg, providing a total of 500 units U in each leg of the bridge 10. All the units U are alike, and only one is shown in detail. This unit is in leg 30 and in addition to the label U, the unit also bears a more specific identification, the reference numeral 50.

Unit 50 is provided with a controllable solid state electronic valve V having a power current inlet electrode A, a power current outlet electrode C, a control electrode G, and an internal main current path extending between electrodes A and C. Valve V may for example be a semiconductor controlled rectifier for example a silicon controlled rectifier. Semiconductor controlled rectifiers are popularly known as thyristors. By way of example valve V is shown as a thyristor. In the case of a thyristor the current inlet electrode A is referred to as an anode, the current output electrode C is referred to as a cathode and the control electrode G is called a gate.

Semiconductor controlled rectifiers are characterized in that they normally block current flow in both directions. However, in response to the application of a control signal of appropriate magnitude and polarity to the control electrode of the valve, while the valve is voltage biased in a particular direction, the valve is rendered highly conductive (fired) in the latter direction, generally referred to as the forward direction. Conduction continues, even after removal of the control (firing) signal, until the main current through the valve falls below a predetermined minimum holding value.

With specific regard to silicon controlled rectifiers, forward voltage is applied to them when the anode is made positive relative to the cathode. With the appropriate positive voltage on the anode; that is, with the main current path of the valve forward biased, the valve will be fired (rendered conductive) when the gate electrode has applied thereto a voltage of appropriate polarity (usually positive) and magnitude to forward bias the gate-cathode junction.

Unit 50 has a main power current path 52 having opposite end terminals 54 and 56. The power path 52 includes in series a network N and the cathode and anode terminals C and A, respectively, of the valve V. Thus, the main current path of valve V is in series in the power path 52. Connected across the valve V is a resistor 58 proportioned to carry several times the rated leakage current of the valve V and thus insure DC voltage sharing along the "string" of units U. A capacitor 60 is connected across valve V to insure AC voltage sharing along the "string" of units U, particularly to absorb excess valve sweep out current (during commutation) brought about by variations in the reverse current sweep out times of the valves. The network N includes an inductor 62 for limiting current rate of rise (*di/dt*) into the valve V during "turn-on." The network N also includes a resistor 64 for damping out oscillations of the resonant circuit formed by the inductor 62 and capacitor 60.

Voltage distribution elements such as resistor 58 and capacitor 60, and current rate of rise suppression networks such as the network N, are disclosed in U.S. Patent application Ser. No. 485,743, entitled "Electrical Apparatus," filed on Sept. 8, 1965, and assigned to Westinghouse Electric Corporation.

The power paths 52 of all the units U in each bridge leg are connected in series.

The gate G and cathode C of the valve V are connected by lines 68 to any suitable firing circuit F which will fire the valves V of the respective legs of the bridge 16 in the proper order to operate the bridge in either the rectifier mode or the inverter mode as the case may be. For example, the legs of the bridge 16 may be fired 60° apart in the following order: leg 36–leg 34–leg 38–leg 30–leg 40–leg 32–leg 36, etc. This is a well known firing order to effect either the rectifier mode or the inverter mode.

Techniques for controlling the firing angle and the conduction angle of the valves V, such as phase control, pulse width modulation, etc., are well known and may be incorporated in the firing circuit F to control average magnitude of output. By way of example, firing circuit F includes a pulser 70 which generates pulses P1, P2, P3, P4, P5 and P6 60° apart in the order named on the output lines indicated by the pulse numbers. Each of the pulse output lines is connected to a plurality of distribution transformers such as indicated at F4, each of which has a plurality of outputs, each output being connected to the gate of a valve V. For example, transformer F4 has four outputs, one connected to the gate G of valve V in unit 50, the other outputs of transformer F4 being connected to the valves in the other three units labeled U in the leg 30. The input of transformer F4 is connected to the output line P4 thus receiving the pulse bearing the same reference P4 occurring in the order position 4.

The output line P4 is also connected to a distribution network F4' which represents a plurality of transformers such as F4, the outputs of which are connected to the valves in the units U in section UX in the leg 30. According to the example, section UX has 496 units U connected in series with the four units labeled U in leg 30 to provide a series string of 500 units U between terminals 24 and 18, that is in leg 30. In keeping with the example, network F4' represents 124 distribution transformers such as transformer F4. Since each distribution transformer, like transformer F4 serves four valves V, the 124 transformers in section F4' serve the other 496 valves V in the section UX of leg 30.

Pulse output lines P1, P2, P3, P5 and P6 are respectively connected to output transformers F1, F2, F3, F5 and F6, each of which is the same as transformer F4. Transformer F1 supplies the valves V in the four units labeled U in leg 36. Transformer F2 supplies pulses to the four units labeled U in leg 34. Transformer F3 supplies pulses to the four units labeled U in leg 38. Transformer F5 supplies pulses to the four units labeled U in leg 40. Transformer F6 supplies pulses to the valves of the four units labeled U in leg 32.

Pulse lines P1, P2, P3, P5 and P6 are also connected to distribution networks F1', F2', F3', F5' and F6', respectively. Each of these distribution networks is the same as the distribution network F4'. Distribution network F1' supplies pulses to all the valves V in the units U of section labeled UX in leg 36. Network F2' supplies pulses to all the valves V in the section UX in leg 34. Network F3' supplies pulses to all the valves in the section UX in leg 38. Network F5' supplies pulses to all the valves in the section UX in leg 40. Network F6' supplies pulses to all the valves in the section UX in leg 30.

From the above it should be apparent that the firing circuit F will fire all the valves V in any given leg at the same time, and that the legs will be fired 60° apart in the following repetitive order: leg 36–leg 34–leg 38–leg 30–leg 40–leg 32.

As hereinbefore stated, any other suitable firing circuit and scheme may be employed, for example the aforementioned U.S. patent application Ser. No. 485,743, discloses firing circuits which may be used in connection with the converter shown herein.

An overvoltage protection network 72 has a circuit 74 connected across a portion of the power circuit 52 that includes the main current path of the valve V (anode and cathode electrodes). One end of circuit 74 is connected to the anode A while the other end is connected to the cathode C. Circuit 74 includes in series an asymmetric current flow device such as a diode 76, a voltage threshold device such as a Zener diode 78, a junction 80 and a capacitor 82. The protection network 72 also includes a voltage breakover device, for example a breakover or trigger diode such as a Shockley diode 84, and a current limiting series resistor 86 connected between the junction 80 and the gate G. A voltage breakover device blocks current flow until the voltage across the device reaches a predetermined value (breakover voltage) at which time the device abruptly breaks over into a low impedance high conduction mode which is maintained until the device recovers its blocking capability, for example when the current therethrough drops below the "holding value." It will be noted that the forward directions of diode 76 and valve V are poled alike relative to voltages across the power path 52. In accordance with accepted convention, the forward directions of diode 76 and thyristor V are in the direction of the arrowheads of their respective drawing symbols. The forward direction of a diode is its easy conduction direction as contrasted with its opposite blocking direction. Also it may be noted that the breakdown or threshold direction of the Zener diode 78 is poled in the same direction as the forward direction of valve V relative to voltages across the power path 52.

Assume that the valves V are 600 volt thyristors and that to prevent two-terminal mode operation and destruction it is desired that the protection network 72 will gate the thyristor when the voltage across the thyristor (across anode-cathode terminals) exceeds 500 volts. In that case the Zener diode 78 threshold voltage and the breakover voltage of the Shockley diode 84 should add up to approximately 500 volts. For example, the threshold voltage of the Zener diode 78 may be 450 volts, and the breakover voltage of the Shockley diode 84 may be 50 volts to provide a total of 500 volts. If desired, a number of Zener diodes having lesser Zener voltages may be connected in series, in lieu of a single Zener diode.

In operation, when the voltage across the thyristor V rises to 450 volts, the Zener diode 78 breaks down in the Zener direction and the capacitor 82 begins to charge. When the voltage across the thyristor reaches 500 volts, the voltage across the capacitor 82 and therefore at the junction 80 is 50 volts, at which time the Shockley diode 84 will breakover to fire the thyristor V. Once the Shockley diode 84 fires (breakover), it continues to conduct into the gate G until the capacitor 82 is discharged. Thus, the gate signal is maintained by the protection circuit 72, even if the voltage across the thyristor drops, thus insuring continued gate drive to avoid the undesirable anode breakover mode of the thyristor.

The diode 76 prevents reverse current through the Zener diode during commutation, thus to protect the Shockley diode 84 and to prevent interference with normal commutation of the thyristor V. In the example the diode 76 should withstand a reverse of about 500 volts.

The Zener diode 78 has any reverse leakage, the capacitor 82 may charge up at some constant rate until it reaches the breakover voltage of the Shockley diode 84 even before the voltage across the thyristor V exceeds or reaches 500 volts. Ideally there would be no leakage and this would not happen. However, if such leakage exists, then a resistor 88 may be connected across capacitor 82 to permit the Zener feedback loop to overcome the effect of leakage current of the Zener. Resistor 88 is of such value that when the capacitor voltage is at the Shockley breakover voltage, current through the resistor will be substantially equal to the maximum leakage of the Zener diode. With the operational values disclosed by way of example and with a capacitor 82 value of approximately .05 microfarad, resistor 88 may have a value of 50,000 ohms to bleed off the charge due to leakage current. Resistor 86 limits current to protect the Shockley diode 84 and the thyristor gate G. By way of example, resistor 86 may have a value of about 50 ohms.

It will be appreciated that when the converter 10 is operating in the inverter mode, commutating aids, for example commutating capacitors between the bridge legs will be required. Techniques and circuits to effect and aid commutation in bridge type inverters are well known in the art and need not be shown or elaborated upon herein. Also reactive energy limiting devices and networks, such as reactors, etc., for use in connection with reactive loads are well known and need not be shown.

It should be appreciated that although the bridge legs are shown as single strings of units U, each leg could be made up if a plurality of parallel strings of units U for increased power capability.

The local protection scheme described herein not only provides means whereby the string of units is protected against an overvoltage across the entire string, but also protects in the event of local faults (arcs, shorts, etc.) within each string or between units in adjacent strings. Faults of the latter type would probably not be detected by systems which monitor only overall string voltages and in response to string overvoltage fire all the units simultaneously from a central device system.

From the description herein, it is seen that the disclosed apparatus provides a novel protection circuit for preventing destructive two-terminal mode or operation of a controlled solid state valve when the voltage thereacross exceeds predetermined limits.

It is understood that the herein described arrangements are simply illustrative of the principles of the invention, and that other embodiments and applications are within the spirit and scope of the invention.

I claim as my invention:

1. In electrical apparatus; a power current path having first and second opposite ends, a controllable solid state valve having a control electrode, said valve also having respective first and second power current electrodes connected in series in said power current path, whereby said power current path passes through said valve between said power current electrodes, a circuit connected across at least a portion of said power current path including said power current electrodes, said circuit including first and second circuit portions with a junction therebetween, said first circuit portion conducting in a particular direction only when voltage thereacross is above a threshold value, said second circuit portion including a capacitor in series therein, and breakover means connected between said junction and said control electrode, said particular direction of the first circuit portion and the forward direction of said valve being poled alike relative to voltages across said power current path whereby said capacitor charges toward the voltage across said power current path when voltage applied across said power path in the forward direction of said valve exceeds the value required to apply said threshold value across said first circuit portion, said threshold value said capacitor and breakover means being correlated so that the capacitor acquires a charge to breakover said breakover means to fire said valve in response to the voltage across said valve exceeding a predetermined value.

2. The combination as in claim 1 wherein said first circuit portion includes means for blocking current flow in the direction opposite to said particular direction.

3. The combination as in claim 1 wherein said first circuit portion includes in series a voltage threshold device and an asymmetric current flow device whose easy conduction direction is in said particular direction.

4. The combination as in claim 1 wherein said first and second power current electrodes are respectively current inlet and current outlet electrodes, and said first circuit portion is connected between said current inlet electrode and said junction, and said second circuit portion is connected between said junction and said current outlet electrode.

5. In electrical converting apparatus; a series first circuit including a plurality of units; each unit comprising a power current path having first and second opposite ends, a controllable solid state valve having a control electrode, said valve also having respective power current inlet and power current outlet electrodes connected in series in said power current path, whereby said power current path passes through said valve between said inlet and outlet electrodes, a second circuit connected across at least a portion of said power current path including said inlet and outlet electrodes, said second circuit including first and second circuit portions with a junction therebetween, said first circuit portion conducting in a particular direction only when voltage thereacross is above a threshold value, said second circuit portion including a capacitor in series therein, and breakover means connected between said junction and said control electrode, said particular direction of the first circuit portion and the forward direction of said valve being poled alike relative to voltages across said first circuit whereby said capacitor charges toward the voltage across said power current path when voltage applied across said power path in the forward direction of said valve exceeds the value required to apply said threshold value across said first circuit portion, said threshold values said capacitor and breakover means being correlated so that the capacitor acquires a charge to breakover said breakover means to fire said valve in response to the voltage across said valve exceeding a predetermined value; said power current paths of said units being connected in series.

6. The combination as in claim 5 which further includes a voltage distribution network having elements connected across each of said valves to enforce a predetermined distribution across said valves of voltages applied across said first circuit.

7. The combination as in claim 5 wherein said first circuit portion includes means for blocking current flow in the direction opposite to said particular direction.

8. The combination as in claim 5 wherein said first circuit portion includes in series a voltage threshold device and an asymmetric current flow device whose easy conduction direction is in said particular direction.

9. The combination as in claim 5 wherein said first circuit portion is connected between said current inlet electrode and said junction, and said second circuit portion is connected between said junction and said current outlet electrode.

10. The combination as inclaim 2 wherein said first and second power current electrodes are respectively current inlet and current outlet electrodes, and said first circuit portion is connected between said current inlet electrode and said junction, and said second circuit portion is connected between said junction and said current outlet electrode.

11. The combination as in claim 3 wherein said first and second power current electrodes are respectively current inlet and current outlet electrodes, and said first circuit portion is connected between said current inlet electrode and said junction, and said second circuit portion is connected between said junction and said current outlet electrode.

12. The combination as in claim 7 wherein said first circuit portion is connected between said current inlet electrode and said junction, and said second circuit portion is connected between said junction and said current outlet electrode.

13. The combination as in claim 8 wherein said first circuit portion is connected between said current inlet electrode and said junction, and said second circuit portion is connected between said junction and said current outlet electrode.

References Cited

UNITED STATES PATENTS

| | | | |
|---|---|---|---|
| 3,267,290 | 8/1966 | Diebold | 307—202 |
| 3,287,576 | 11/1966 | Motto | 307—252 |
| 3,331,990 | 7/1967 | Johansson | 317—31 |
| 3,332,000 | 7/1967 | Greening et al. | 321—11 X |

JOHN F. COUCH, *Primary Examiner.*

J. D. TRAMMELL, *Assistant Examiner.*

U.S. Cl. X.R.

307—202, 252; 317—33; 321—11